United States Patent [19]

Arino et al.

[11] Patent Number: 4,689,958
[45] Date of Patent: Sep. 1, 1987

[54] BRAKE BOOSTER

[75] Inventors: Masao Arino, Higashimatsuyama; Michio Kobayashi, Kawajima, both of Japan

[73] Assignee: Jidosha Kiki Co., Ltd., Shibuya, Japan

[21] Appl. No.: 898,177

[22] Filed: Aug. 19, 1986

[30] Foreign Application Priority Data

Sep. 30, 1985 [JP] Japan .................................. 60-149499

[51] Int. Cl.[4] .............................................. B60T 13/40
[52] U.S. Cl. .................................... 60/547.1; 411/171
[58] Field of Search ................ 60/547.1; 92/169, 128; 411/171, 376

[56] References Cited

U.S. PATENT DOCUMENTS 4,466,246  8/1964  Furuta et al. ....................... 60/547.1
4,583,366  4/1986  Tsubouchi .......................... 60/547.1

FOREIGN PATENT DOCUMENTS 99450    6/1982  Japan ................................. 60/547.1
2085105B 7/1984  United Kingdom .

Primary Examiner—Alan Cohan
Attorney, Agent, or Firm—Flynn, Thiel, Boutell & Tanis

[57] ABSTRACT

A brake booster, in particular, a construction for strengthening the coupling between the brake booster and a master cylinder, is disclosed. The head of a bolt which extends through an enclosed shell is welded to the internal surface of the shell so as to maintain a hermetic seal, and a strengthening plate disposed around the bolt head is welded to the internal surface of the shell. Additionally, a reinforcing member fixedly connected to the strengthening plate is welded to the bolt head to improve the rigidity of the strengthening plate.

7 Claims, 4 Drawing Figures

FIG. 2
FIG. 3
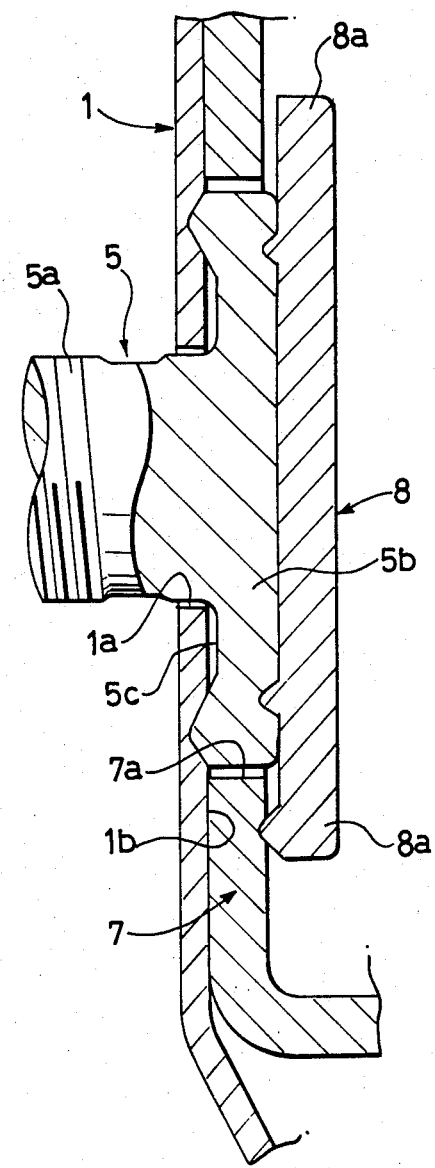
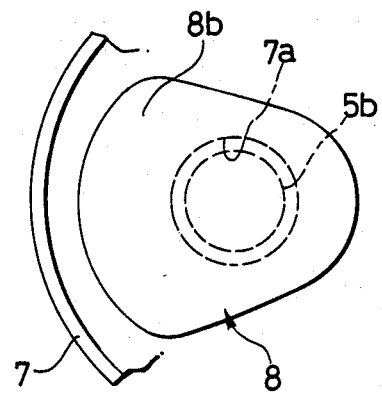

BRAKE BOOSTER

BACKGROUND OF THE INVENTION

The invention relates to a brake booster, in particular, to the construction of a coupling with a master cylinder.

A brake booster includes an enclosed shell, the interior of which is divided by a diaphragm into a plurality of pressure chambers to produce a pressure differential between these pressure chambers, thereby causing a reciprocating movement of a power piston to provide a booster action. To meet the requirement for a reduced weight of vehicle, it is also desired to reduce the weight of the brake booster by reducing the sheet thickness of the shell. However, a reduction in the wall thickness of the shell presents a problem in respect of a reduced strength thereof. A master cylinder is secured to the front side of the shell by means of mounting bolts, which are subject to a tension of an increased magnitude during the operation of the brake booster, presenting a problem relating to the strength of the mounting area.

To accommodate for this, a variety of boosters have been proposed including the provision of a strengthening plate in the region of the mounting bolt in an attempt to improve the strength (see Japanese Utility Model Publication No. 17,402/1985, Japanese Laid-Open Patent Application No. 99,450/1982, etc.).

In the booster disclosed in these examples, the strengthening plate is formed with an opening through which the shank of a mounting bolt extends, and this causes a substantial reduction in the rigidity in the area around the mounting bolt, which has a significant contribution to the strength. The strengthening plate is held between the both head and shell, and this tends to cause a shunt path for a welding current during a welding operation, disadvantageously resulting in a non-uniform welding quality.

SUMMARY OF THE INVENTION

Therefore, it is an object of the invention to improve the strengthening effect afforded by a strengthening plate which is disposed around a mounting bolt used to connect a master cylinder to a brake booster, by enhancing the rigidity of the strengthening plate.

The above object is accomplished by disposing a strengthening plate around a bolt which is used to attach a master cylinder, welding the strengthening plate to the internal surface of a shell while welding the bolt head to the internal surface of the shell so as to maintain a hermetic seal therebetween, and disposing a reinforcing member connected to the strengthening plate on top of the bolt head and welding the reinforcing member to the bolt head.

BRIEF DESCRIPTION OF THE DRAWINGS

FIG. 2 is an enlarged section of part of the booster shown in FIG. 1;

FIG. 3 illustrates one form of a reinforcing member; and

DESCRIPTION OF EMBODIMENTS

Figure 1:
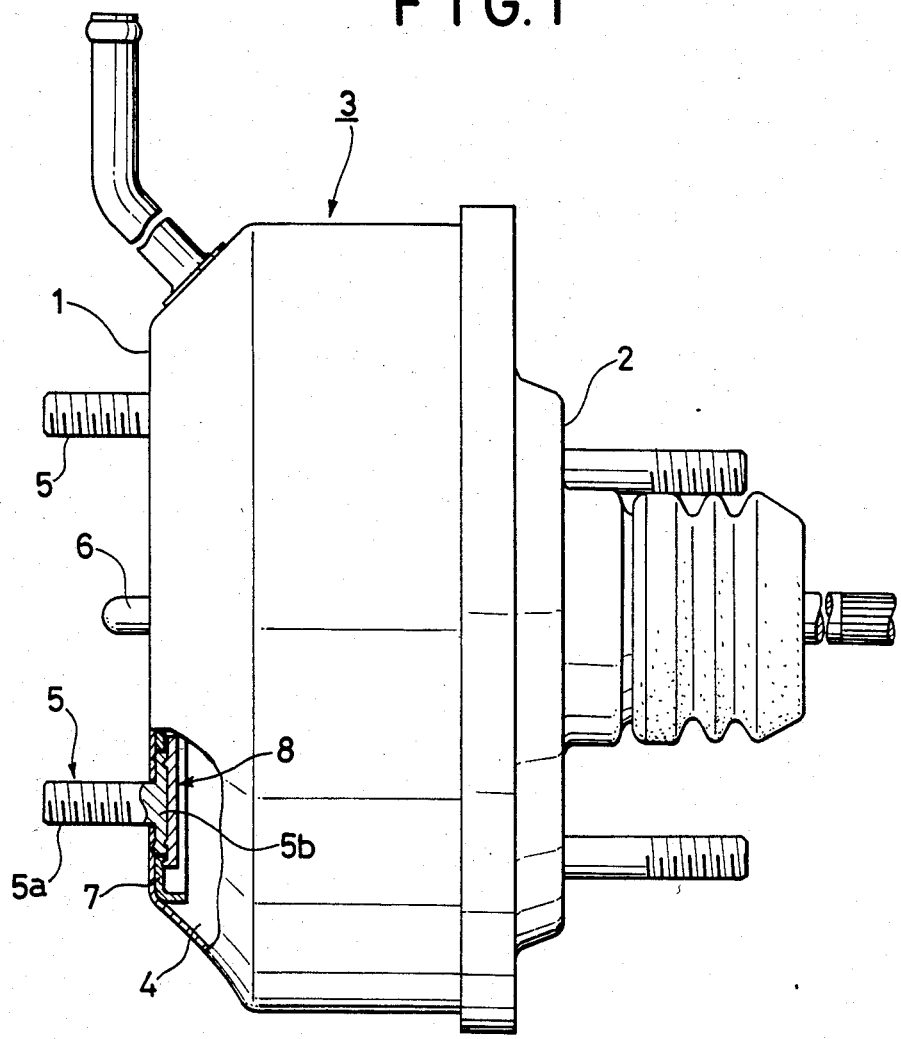
FIG. 1 is a side elevation, partly in section, of a brake booster according to an embodiment of the invention.

Referring to the drawings, several embodiments of the invention will now be described. A brake booster according to an embodiment of the invention is shown in side elevation, partly in section, in FIG. 1, and its portion is shown in enlarged section in FIG. 2. Referring to these Figures, the booster includes a front shell 1 and a rear shell 2 which are coupled together to define an enclosed shell 3. While the interior of the enclosed shell 3 is not illustrated in detail, it will be appreciated that the interior is divided by a combination of a power piston and a diaphragm into a forwardly located negative pressure chamber 4 and a rearwardly located atmospheric chamber. A valve mechanism (not shown) which is well known in itself controls a communication between the negative pressure chamber and the atmospheric chamber as well as a communication between the atmospheric chamber and the atmosphere, thus producing a pressure differential between the both chambers to provide a booster action.

A master cylinder, not shown, is secured to the front end face of the enclosed shell 3 by means of plurality of mounting bolts 5 while an output from the booster is transmitted to the master cylinder through a push rod 6 which hermetically extends through the center of the end wall of the front shell 1.

The construction of the coupling between the master cylinder and the brake booster will be described with reference to FIGS. 1 and 2. The front shell 1 is formed with openings 1a, each of which is sized to permit the shank 5a of a mounting bolt 5 to extend therethrough. The mounting bolt 5 has a head 5b, and an end face 5c thereof which is located nearer the shank is projection welded to the internal surface 1b of the shell to maintain a hermetic seal therebetween while the shank 5a extends externally of the enclosed shell 3 through the opening 1a. A strengthening plate 7 is disposed around the mounting bolt 5, and is formed with an opening 7a of a diameter which is greater than the outer diameter of the bolt head 5b, and the strengthening plate is directly welded to the internal surfce 1b of the shell while the bolt head 5b is positioned within the opening 7a. In addition, a reinforcing member 8 is disposed on top of the bolt head 5b and has an area greater than that of the bolt head 5b, with its peripheral edge 8a disposed in overlapping relationship with the strengthening plate 7. The peripheral edge 8a is welded to the strengthening plate 7, and the reinforcing member is also welded to the the bolt head 5b at a location inwardly spaced from the peripheral edge 8a.

When the reinforcing member 8 is connected to the strengthening plate 7 around the edge of the opening 1a and fixedly welded to the bolt head 5b, in addition to the provision of the strengthening plate 7, the rigidity of the strengthening plate 7 around the mounting bolt 5 can be enchanced, effectively strengthening an area of stress concentration which is created ouside the welded portions of the mounting bolt 5. In this manner, the wall thickness of the shell 3 and the strengthening plate 7 can be further reduced, allowing a further reduction in the weight of the booster. Since the welding of the mounting bolt 5 can take place independently from the strengthening plate another advantage is gained that uniform welding quality is achieved.

The reinforcing member may have any desired configuration since it is separate from the strengthening plate 7. By way of example, it may have a non-circular configuration, having an extended area 8b where the stress concentration is likely to occur, as illustrated in FIG. 3, for increased strengthening effect. It should be noted that the location and the number of welding spots between the strengthening plate 7 and the reinforcing member 8 as well as between reinforcing member 8 and the mounting bolt 5 can be suitably chosen as desired.

Figure 4:
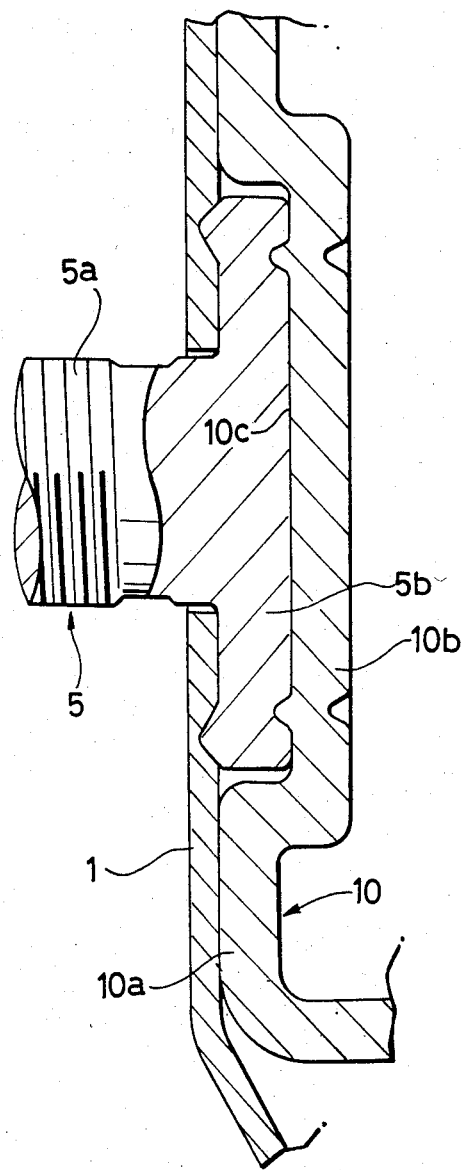
FIG. 4 is an enlarged section similar to FIG. 2 for a second embodiment of the invention.

FIG. 4 shows a second embodiment of the invention in which the strengthening plate 7 and the reinforcing member 8 of the first embodiment is combined into a one-piece strengthening member 10. In this embodiment, the strengthening member 10 includes a portion 10a which is directly welded to the front shell 1 to strengthen it, and a recessed portion 10b which receives the bolt head 5b. The bottom surface 10c of the recessed portion 10b is projection welded to the bolt head 5b. By providing a one-piece assembly including a first portion 10b disposed on top of the bolt head 5b and welded thereto and equivalent to the reinforcing member 8 of the first embodiment, and a second portion 10a which is welded to the front shell 1 to strengthen it and equivalent to the strengthening plate 7 of the first embodiment, the rigidity of the portion 10a which is welded to the front shell 1 can be further improved.

While the invention has been illustrated and described above in connection with several embodiments thereof, it should be understood that a number of changes, substitutions and modifications will readily occur to one skilled in the art without departing from the scope and spirit of the invention as defined by the appended claims.

What is claimed is:

1. A brake booster including an enclosed shell which has its interior divided into a plurality of pressure chambers, a master cylinder fastened to the enclosed shell by mounting bolts which extends through the front end face of the shell, and strengthening plate disposed against the internal surface of the shell around each of the mounting bolts; characterized in that the strengthening plate is welded to the internal surface of the shell while the head of the mounting bolt is welded to the internal surface of the shell so as to maintain a hermetic seal therebetween, and a reinforcing member fixedly connected to the strengthening plate is disposed on top of the head of the mounting bolt and welded thereto.

2. A brake booster according to claim 1 in which the reinforcing member is welded to the strengthening plate.

3. A brake booster according to claim 2 in which the reinforcing member is non-circular in configuration and is extended toward the outer periphery of the enclosed shell.

4. A brake booster according to claim 3 in which the reinforcing member is substantially fan-shaped.

5. A brake booster according to claim 1 in which the reinforcing member and the strengthening plate are integrally formed into a strengthening member.

6. A brake booster according to claim 5 in which the strengthening member includes a portion which bears against the internal surface of the shell and a recessed portion which receives the bolt head.

7. A brake booster according to claim 6 in which the bottom surface of the recess in the strengthening member is welded to the bolt head.

* * * * *